US012141460B2

(12) United States Patent
Lin

(10) Patent No.: US 12,141,460 B2
(45) Date of Patent: Nov. 12, 2024

(54) METHOD AND APPARATUS FOR PERFORMING DATA ACCESS MANAGEMENT OF ALL FLASH ARRAY SERVER

(71) Applicant: Silicon Motion, Inc., Hsinchu County (TW)

(72) Inventor: Yi-Feng Lin, Changhua County (TW)

(73) Assignee: Silicon Motion, Inc., Hsinchu County (TW)

( * ) Notice: Subject to any disclaimer, the term of this patent is extended or adjusted under 35 U.S.C. 154(b) by 104 days.

(21) Appl. No.: 16/984,132

(22) Filed: Aug. 3, 2020

(65) Prior Publication Data

US 2021/0271393 A1    Sep. 2, 2021

Related U.S. Application Data

(60) Provisional application No. 62/983,756, filed on Mar. 2, 2020.

(51) Int. Cl.
*G06F 3/06* (2006.01)
*G06F 12/10* (2016.01)
*G06F 13/16* (2006.01)

(52) U.S. Cl.
CPC ........... *G06F 3/065* (2013.01); *G06F 3/0604* (2013.01); *G06F 3/0659* (2013.01); *G06F 3/0688* (2013.01); *G06F 12/10* (2013.01); *G06F 13/1668* (2013.01); *G06F 2212/657* (2013.01)

(58) Field of Classification Search
CPC ...... G06F 3/065; G06F 3/0604; G06F 3/0659; G06F 3/0688; G06F 12/10; G06F 13/1668; G06F 2212/657
See application file for complete search history.

(56) References Cited

U.S. PATENT DOCUMENTS

| 9,286,007 B1 * | 3/2016 | Bono .................. G06F 3/067 |
| 10,114,829 B1 * | 10/2018 | Bono .................. G06F 16/172 |
| 2002/0185337 A1 | 12/2002 | Miura |

(Continued)

FOREIGN PATENT DOCUMENTS

| CN | 102693214 A | 9/2012 |
| CN | 105264493 A | 1/2016 |
| CN | 109697025 A | 4/2019 |

(Continued)

*Primary Examiner* — Gary W. Cygiel
(74) *Attorney, Agent, or Firm* — Winston Hsu

(57) ABSTRACT

A method for performing data access management of an all flash array (AFA) server and the AFA server operating according to the method are provided. The method includes: utilizing an upper layer program module running on a first node to detect whether any request from a client device of a user is received; in response to a write request, utilizing an intermediate layer program module to mirror data corresponding to the write request to a second node; and before the intermediate layer program module flushing the data to a lower layer program module, in response to the data being mirrored from a first volatile memory of the first node to a second volatile memory of the second node, utilizing the intermediate layer program module to send an acknowledgement to the client device without checking whether the data has been protected in any non-volatile memory of any of the multiple nodes.

13 Claims, 11 Drawing Sheets

(56) References Cited

U.S. PATENT DOCUMENTS

2018/0075056 A1\* 3/2018 Colgrove .............. G06F 3/0637

FOREIGN PATENT DOCUMENTS

| JP | 11-239254 A | 8/1999 |
| --- | --- | --- |
| JP | 2001-510612 A | 7/2001 |
| JP | 2004-246939 A | 9/2004 |
| KR | 10-2013-0125556 A | 11/2013 |
| TW | 201926043 A | 7/2019 |
| TW | 202008170 A | 2/2020 |

\* cited by examiner

METHOD AND APPARATUS FOR PERFORMING DATA ACCESS MANAGEMENT OF ALL FLASH ARRAY SERVER

CROSS REFERENCE TO RELATED APPLICATIONS

This application claims the benefit of U.S. Provisional Application No. 62/983,756, which was filed on Mar. 2, 2020, and is included herein by reference.

BACKGROUND OF THE INVENTION

1. Field of the Invention

The present invention is related to memory control, and more particularly, to a method for performing data access management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As non-volatile (NV) memories such as Flash memories have been widely applied to various data storage device such as solid state drives (SSDs), etc., it is proposed in the related art to implement the data storage server to be a non-volatile (NV) memory type data storage server using NV memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a method for performing data access management of an all flash array (AFA) server, and associated apparatus (e.g. the AFA server, a control circuit thereof, etc.), in order to solve the above-mentioned problems.

It is another objective of the present invention to provide a method for performing data access management of an AFA server, and associated apparatus (e.g. the AFA server, a control circuit thereof, etc.), in order to protect data in the AFA server.

At least one embodiment of the present invention provides a method for performing data access management of an AFA server, where the method may comprise: utilizing an upper layer program module above an intermediate layer program module among multiple program modules running on a first node of multiple nodes of the AFA server to detect whether any request from a client device of a user is received, wherein at least one request comprising a write request is received; in response to the write request, utilizing the intermediate layer program module to mirror data corresponding to the write request to a second node of the multiple nodes through at least one communications path between the first node and the second node, wherein the data is mirrored from a first volatile memory of the first node to a second volatile memory of the second node; and before the intermediate layer program module flushing the data to a lower layer program module below the intermediate layer program module among the multiple program modules, in response to the data being mirrored from the first volatile memory of the first node to the second volatile memory of the second node, utilizing the intermediate layer program module to send an acknowledgement (Ack) corresponding to the write request to the client device through the upper layer program module without checking whether the data has been protected in any non-volatile memory of any of the multiple nodes.

At least one embodiment of the present invention provides an all flash array (AFA) server. The AFA server may comprise multiple nodes comprising a first node and a second node, and comprise a plurality of solid state drives (SSDs). More particularly, the first node comprises: at least one processor, arranged to control operations of the first node under control of a first set of program modules; and a first volatile memory, arranged to temporarily store information for the first node. The second node comprises: at least one processor, arranged to control operations of the second node under control of a second set of program modules, wherein the second set of program modules are the same as the first set of program modules, respectively; and a second volatile memory, arranged to temporarily store information for the second node. The plurality of SSDs may comprise a first SSD group corresponding to the first node and a second SSD group corresponding to the second node. For example, an upper layer program module above an intermediate layer program module among the first set of program modules running on the first node detects whether any request from a client device of a user is received, wherein at least one request comprising a write request is received; in response to the write request, the intermediate layer program module mirrors data corresponding to the write request to the second node through at least one communications path between the first node and the second node, wherein the data is mirrored from the first volatile memory of the first node to the second volatile memory of the second node; and before the intermediate layer program module flushing the data to a lower layer program module below the intermediate layer program module among the first set of program modules, in response to the data being mirrored from the first volatile memory of the first node to the second volatile memory of the second node, the intermediate layer program module sends an acknowledgement (Ack) corresponding to the write request to the client device through the upper layer program module without checking whether the data has been protected in any non-volatile memory of any of the multiple nodes.

The present invention method and associated apparatus (e.g. the AFA server, a control circuit thereof, etc.) can enhance overall performance, and protect data according to multiple control schemes of the method. In addition, the present invention method and associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
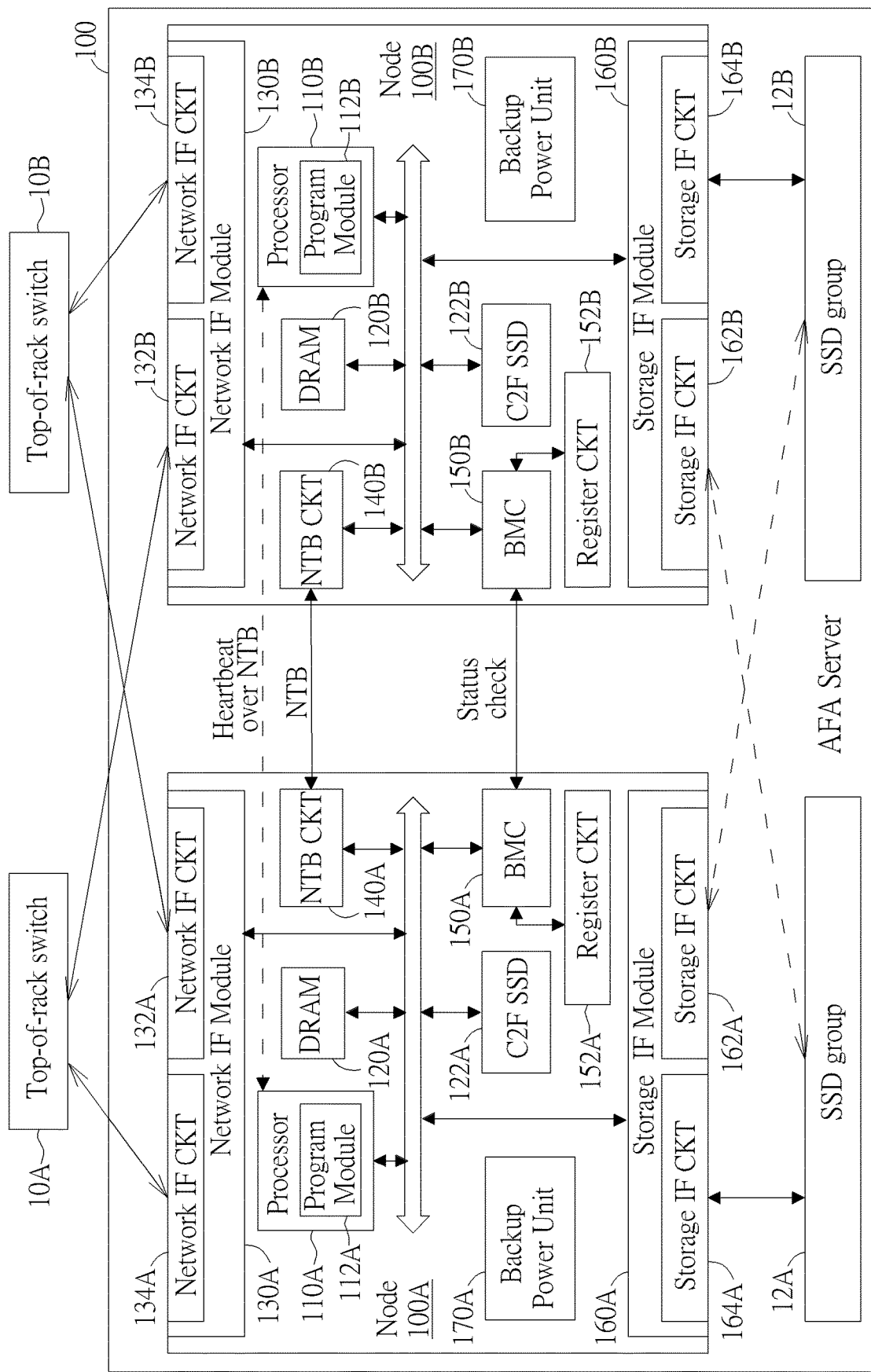
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120n, a C2F SSD 122n, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150n, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g.

main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122n, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120n, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120n, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 10B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
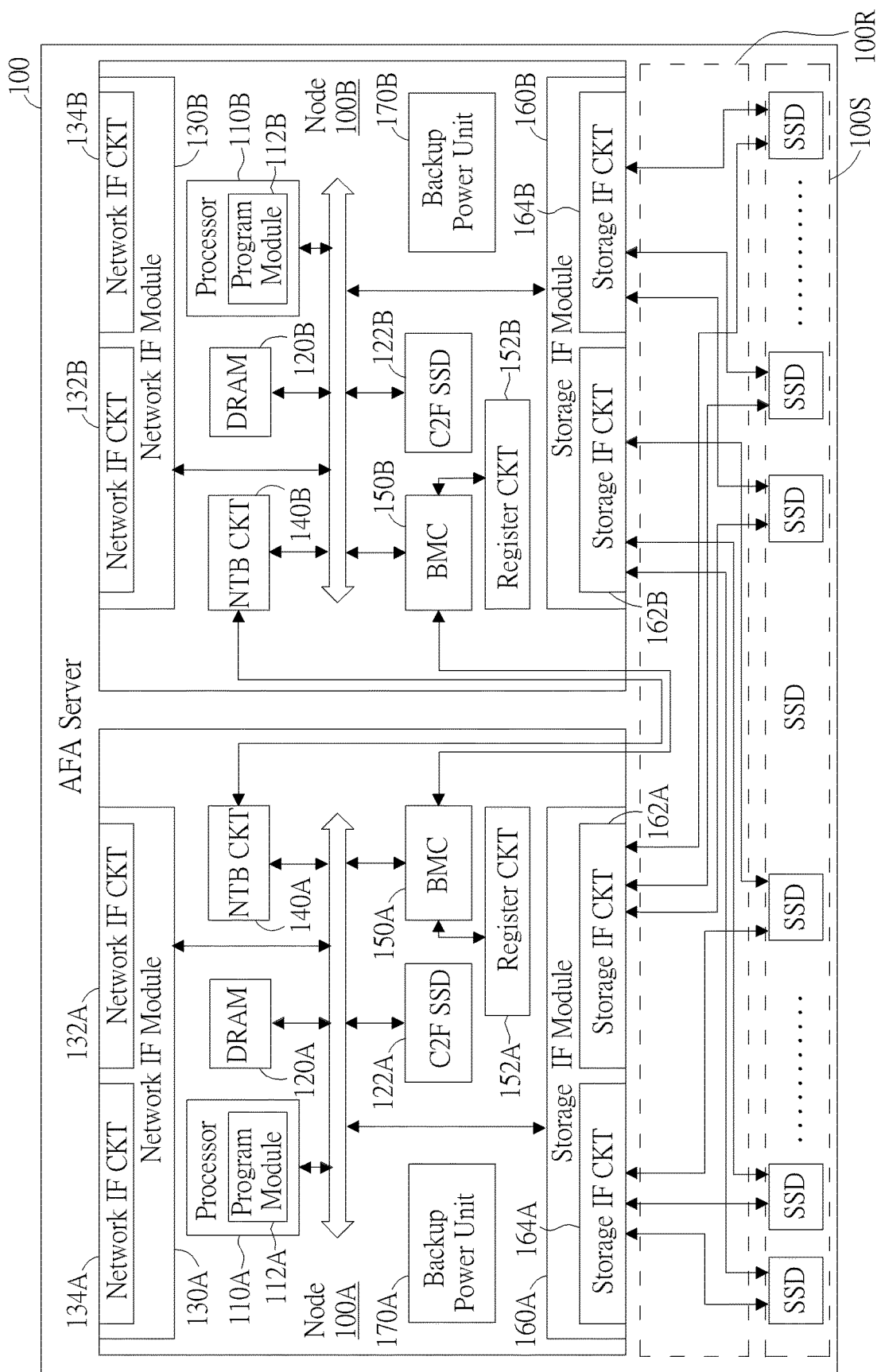
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
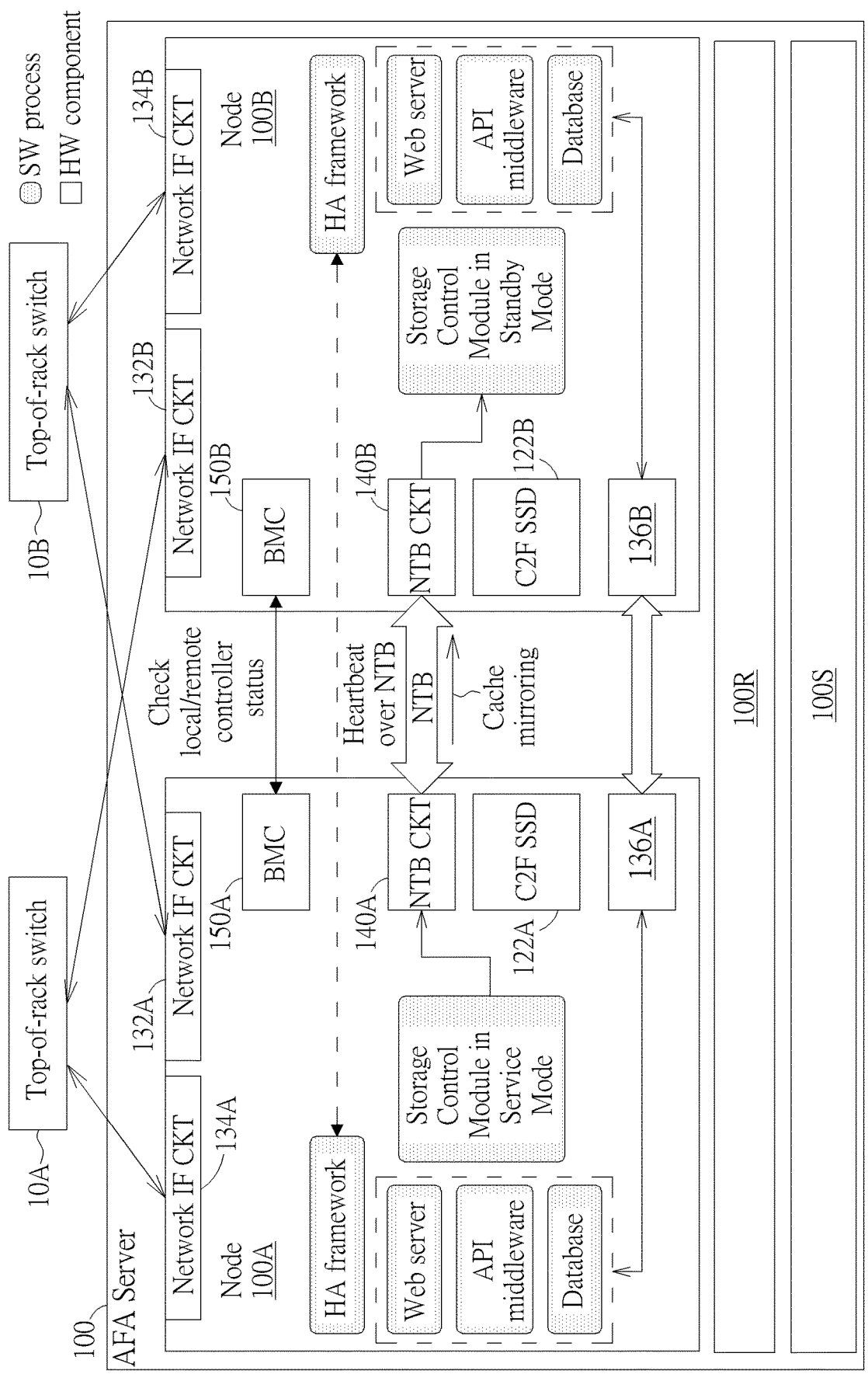
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
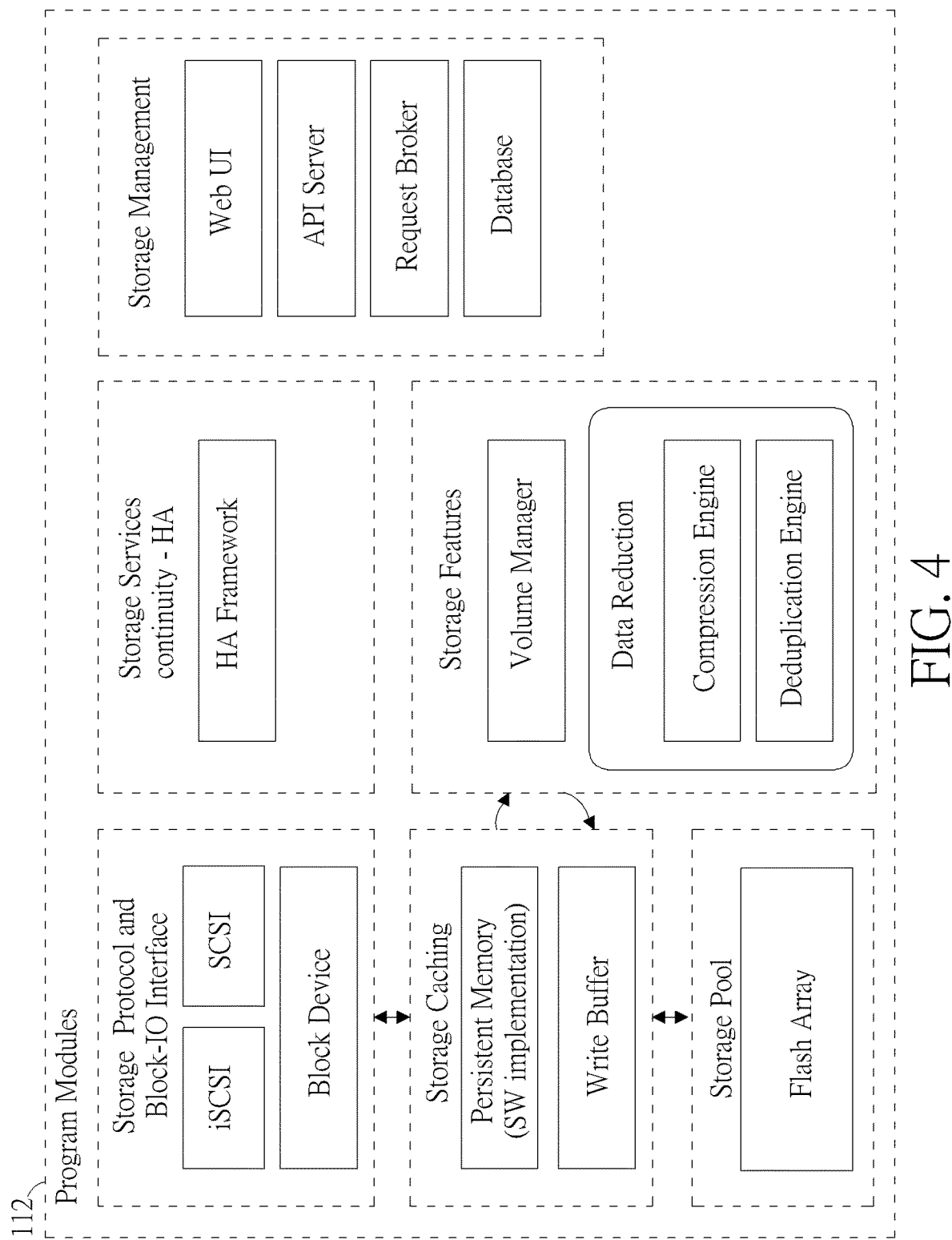
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (IO) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-IO Interface module and the Storage Pool module can be configured to interact with the client device and the SSD group, but the present invention is not limited thereto. When there is a need, the node can trigger other program modules to interact with one or more of these program modules.

The Storage Protocol and Block-IO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array for brevity). The Storage Services continuity—HA module may comprise a sub-module such as a HA Framework module (labeled "HA Framework for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UI) module, an Application Programming Interface (API) Server module, a Request Broker module and a Database module (respectively labeled "Web UI", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
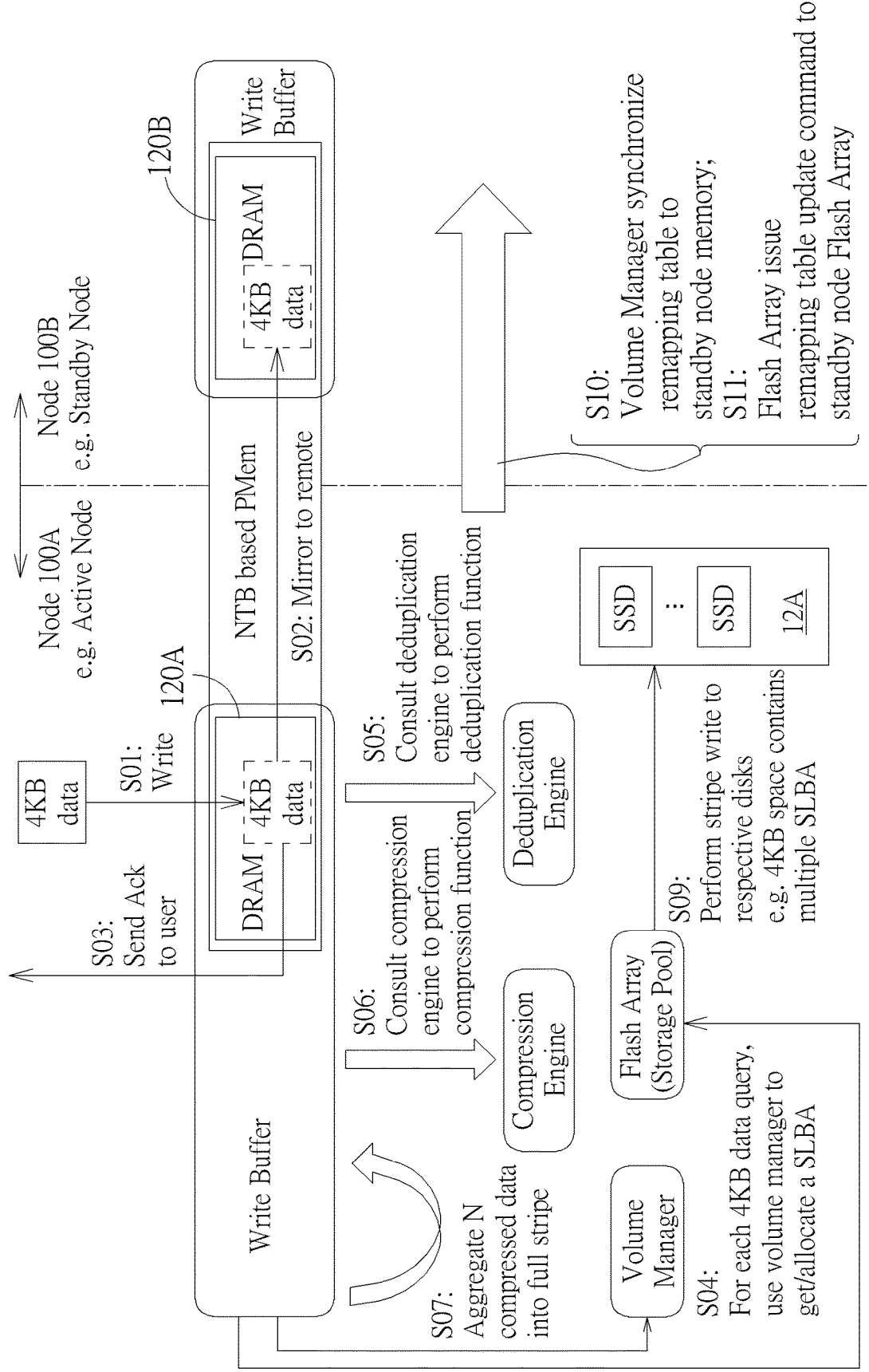
FIG. 5 illustrates a write control scheme of a method for performing data access management of an AFA server such as that shown in FIG. 1 according to an embodiment of the present invention.

FIG. 5 illustrates a write control scheme of a method for performing data access management of an AFA server such as that shown in FIG. 1 according to an embodiment of the present invention. The method can be applied to the AFA server 100 shown in FIG. 1. For better comprehension, the nodes 100A and 100B can play the role of the active node and the role of the standby node, respectively, but the present invention is not limited thereto. In response to the write request, the active node (e.g. one of the nodes 100A and 100B, such as the node 100A in this embodiment) can utilize the Write Buffer module to receive data (e.g. 4 kilobytes (KB) data, referred to as 4 KB data for brevity) corresponding to the write request and write (e.g. buffer) the data into the write buffer thereof (e.g. the DRAM of this node) in Step S01, mirror the data such as the 4 KB data to the standby node (e.g. another of the nodes 100A and 100B, such as the node 100B in this embodiment) through the NTB path in Step S02, and send an acknowledgement (Ack) corresponding to the write request to the client device of the user in Step S03. As the data has been mirrored to the remote side (e.g. the DRAM 120B in this embodiment), the mirrored data is protected by the standby node (e.g. the Write Buffer module thereof).

Regarding subsequent operations of the active node, in Step S04, for each 4 KB data query, the Write Buffer module can use the Volume Manager module to get or allocate a storage pool logical block address (SLBA) for the data. In Step S05, the Write Buffer module can consult the Deduplication Engine to perform a deduplication function on the data. In Step S06, the Write Buffer module can consult the Compression Engine to perform a compression function on the data. In Step S07, when a data amount of buffered data (e.g. the data to be written) in the DRAM (e.g. the DRAM 120A in this embodiment) reaches a predetermined threshold, for example, the active node has collected N sets of compressed data and the total data amount of the N sets of compressed data is suitable for being stored as a full stripe, the active node can utilize the Flash Array module to aggregate the N sets of compressed data (which can be referred to as N compressed data for brevity) into the full stripe. For example, the full stripe may represent a stripe comprising a predetermined number of chunks (e.g. twelve chunks), where these chunks may comprise a first predetermined number of data chunks (e.g. ten data chunks) and a second predetermined number of parity chunks (e.g. two parity chunks). In Step S08, after collecting one or more stripes such as a predetermined amount of stripes (e.g. any of one stripe, two stripes, three stripes, four stripes, etc., depending on various control schemes of the method), the active node can utilize the Write Buffer module to submit array information such as an array of SLBAs, an array of compressed data, etc. (e.g. the array of {Array of SLBAs, Array of compressed data}) to the Flash Array module (or the Storage Pool module), for writing the one or more stripes. In Step S09, the Flash Array module can perform stripe write to respective disks (e.g. the SSD group of the active node, such as the SSD group 12A in this embodiment). For example, as the Compression Engine has performed the compression function in Step S06, 4 KB space contains respective compressed data of multiple SLBA.

After performing the operations of Step S01-S09 as shown in FIG. 5, the active node can transmit associated management information to the standby node to update the management information in the standby node, in order to make the standby node be capable of replacing the active node to continue providing the storage service of the AFA server 100 for the users when there is a need. For example, in Step S10, the Volume Manager module of the active node can synchronize (e.g. update and transmit) a remapping table of the Volume Manager module to the standby node memory (e.g. the memory of the standby node), for controlling (e.g. generating, updating, etc.) some mapping relationships managed by the Volume Manager module. In Step S11, the Flash Array module of the active node can issue a remapping table update command to the standby node Flash Array (e.g. the Flash Array module of the standby node), to update a remapping table of the Flash Array module to the standby node memory (e.g. the memory of the standby node), for controlling (e.g. generating, updating, etc.) some mapping relationships managed by the Flash Array module. While the active node is capable of performing these operations in response to the write request as described above, the active node is capable of performing associated operations in response to the read request to recover the data, for example, according to the mapping relationships respectively managed by the Volume Manager module and the Flash Array module, where some implementation details regarding managing these mapping relationships will be described in some of the subsequent embodiments.

As shown in the upper half of FIG. 5, with the aid of software emulation, any node (e.g. each node) of the nodes 100A and 100B may comprise an emulated persistent memory (which may be referred to as PMem for brevity) based on another node of the multiple nodes, where the PMem can operate on the NTB path, and therefore can be regarded as the NTB based PMem. For example, the any node such as the node 100A can play the role of the active node and the other node such as the node 100B can play the role of the standby node. When a power failure of the main power source of the active node (e.g. the power failure of both of the respective main power sources of the nodes 100A and 100B) occurs, the active node can flush existing information (e.g. buffered data, management table, etc.) in the DRAM thereof into both of an internal non-volatile memory (NVM) storage device (e.g. the C2F SSD of the active node, such as the C2F SSD 122A in this embodiment) and the PMem. More particularly, as each of the nodes is equipped with its own internal NVM storage device(s) and PMem, the standby node can flush the existing information flushed from the active node (e.g. the buffered data, the management table, etc. flushed from the active node) in the DRAM thereof into an internal NVM storage device (e.g. the C2F SSD of the standby node, such as the C2F SSD 122B in this embodiment).

For the active node, although the DRAMs 120A and 120B in the NTB based PMem are volatile memories, the AFA server 100 can utilize the NTB based PMem as a persistent memory with the aid of software emulation, since the standby node that is operating under control of the Write Buffer module thereof can protect any existing information flushed from the active node. When the power failure occurs, the active node can flush the existing information in the DRAM thereof into the internal NVM storage device such as one of multiple NVM storage devices conforming to M.2 specification, and can flush the existing information in the DRAM thereof into the PMem by sending the existing information to the DRAM of the standby node through the NTB path. As a result, the standby node can flush the existing information in the DRAM thereof into the internal NVM storage device thereof (e.g. one of multiple NVM storage devices conforming to M.2 specification).

According to some embodiments, the nodes 100A and 100B can exchange the roles of the active node and the standby node, and can perform the respective operations of the nodes 100B and 100A as described above. For brevity, similar descriptions for these embodiments are not repeated in detail here.

Figure 6:
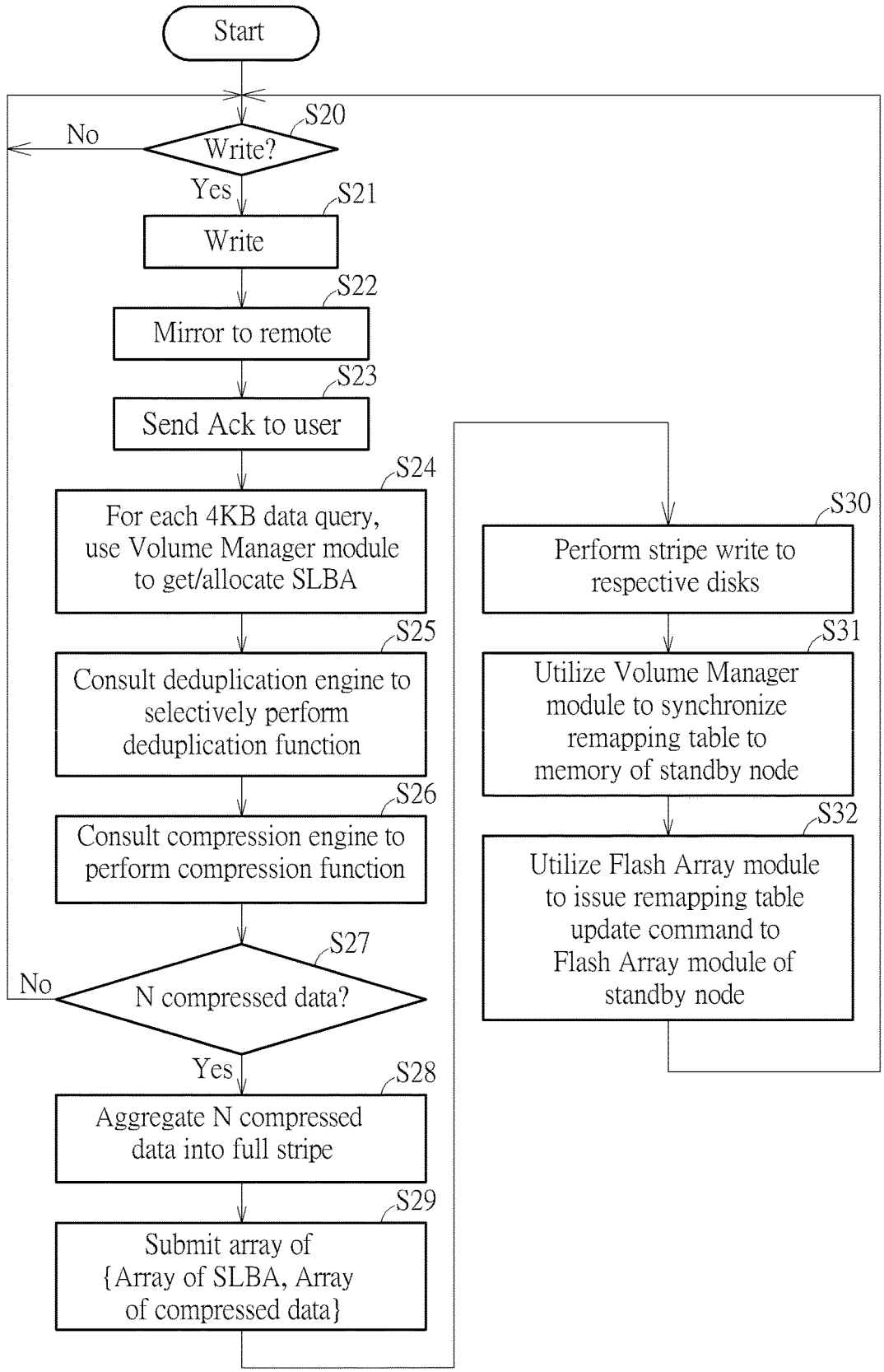
FIG. 6 is a flowchart regarding the write control scheme shown in FIG. 5 according to an embodiment of the present invention.

FIG. 6 is a flowchart regarding the write control scheme shown in FIG. 5 according to an embodiment of the present invention. For better comprehension, the nodes 100A and 100B can play the role of the active node and the role of the standby node, respectively, but the present invention is not limited thereto.

In Step S20, the active node (e.g. one of the nodes 100A and 100B, such as the node 100A in this embodiment) can utilize the Storage Protocol and Block-IO Interface module to detect whether any request such as the write request is received. If Yes, Step S21 is entered; if No, Step S20 is re-entered.

In Step S21, in response to the write request, the active node can utilize the Write Buffer module to receive the data (e.g. the 4 KB data) corresponding to the write request and write (e.g. buffer) the data into the write buffer such as the DRAM of this node (labeled "Write" for brevity).

In Step S22, the active node can utilize the Write Buffer module to mirror the data such as the 4 KB data to the standby node (e.g. another of the nodes 100A and 100B, such as the node 100B in this embodiment) through the NTB path (labeled "Mirror to remote" for brevity).

In Step S23, the active node can utilize the Write Buffer module to send the acknowledgement (Ack) corresponding to the write request to the client device of the user, for example, through the upper layer program module such as the Storage Protocol and Block-IO Interface module.

In Step S24, for each 4 KB data query, the Write Buffer module can use the Volume Manager module to get or allocate the SLBA for the data.

In Step S25, the Write Buffer module can consult the Deduplication Engine to selectively perform the deduplication function on the data. For example, if the data mentioned in Step S21 exists in the SSD group of the active node, performing deduplication is required; otherwise, performing deduplication is not required.

In Step S26, the Write Buffer module can consult the Compression Engine to perform the compression function on the data.

In Step S27, the active node can utilize the Flash Array module to check whether an amount of buffered data that is suitable for being stored as a full stripe (such as the stripe comprising the predetermined number of chunks, as mentioned in the embodiment shown in FIG. 5), for example, the N sets of compressed data such as the N compressed data, has been collected. If Yes, Step S28 is entered; if No, Step S20 is re-entered.

In Step S28, the active node can utilize the Flash Array module to aggregate the N sets of compressed data such as the N compressed data into the full stripe, and more particularly, to allocate storage space in the SSD group for the full stripe.

In Step S29, the active node can utilize the Write Buffer module to submit the array information such as the array of {Array of SLBAs, Array of compressed data} to the Flash Array module.

In Step S30, the active node can utilize the Flash Array module to perform stripe write to respective disks in the SSD group of the active node (e.g. the SSD group 12A in this embodiment), and more particularly, to write the full stripe into the SSD group. For example, after the full stripe has been written into the SSD group, the full stripe may comprise a set of data chunks respectively stored in some of the SSDs in the SSD group of the node and a set of parity chunks respectively stored in some others of the SSDs in the SSD group of the node, such as ten data chunks (e.g. data chunks D1, D2, . . . , and D10) respectively stored in ten SSDs in the SSD group and two parity chunks (e.g. parity chunks P and Q) respectively stored in two other SSDs in the SSD group.

In Step S31, the active node can utilize the Volume Manager module to synchronize (e.g. update and transmit) the remapping table of the Volume Manager module to the memory of the standby node, for controlling (e.g. generating, updating, etc.) the mapping relationships managed by the Volume Manager module.

In Step S32, the active node can utilize the Flash Array module to issue the remapping table update command to the Flash Array module of the standby node, to update the remapping table of the Flash Array module to the memory of the standby node, for controlling (e.g. generating, updating, etc.) the mapping relationships managed by the Flash Array module.

According to this embodiment, each node of the nodes 100A and 100B can be protected with a Redundant Array of Independent Disks (RAID) level 6 (RAID-6) configuration, where the respective Flash Array modules of the nodes 100A and 100B can perform stripe write or stripe read according to the RAID-6 configuration, but the present invention is not limited thereto. In addition, during writing, the Flash Array module of the active node can collect compressed data to generate the set of parity chunks such as the ten data chunks (e.g. the data chunks D1, D2, . . . , and D10) and perform parity calculation on the set of parity chunks to generate the set of parity chunks such as the two parity chunks (e.g. the parity chunks P and Q), and further write all chunks of the full stripe (e.g. the ten data chunks and the two parity chunks) into the associated SSDs (e.g. twelve SSDs) of the SSD group, respectively. For example, when the SSD group comprises twelve SSDs, the Flash Array module can write a stripe to the twelve SSDs to evenly use the storage space of the SSD group; when the SSD group comprises twenty-four SSDs (e.g. (12*2)=24), the Flash Array module can write two stripes to the twenty-four SSDs (e.g. one stripe per 12 SSDs) to evenly use the storage space of the SSD group; when the SSD group comprises thirty-six SSDs (e.g. (12*3)= 36), the Flash Array module can write three stripes to the thirty-six SSDs (e.g. one stripe per 12 SSDs) to evenly use the storage space of the SSD group; and the rest can be deduced by analogy, but the present invention is not limited thereto.

For better comprehension, the method may be illustrated with the working flow shown in FIG. 6, but the present invention is not limited thereto. According to some embodiments, one or more steps may be added, deleted, or changed in the working flow shown in FIG. 6.

Further details such as implementation of multiple types of addresses, address remapping, storage pool, storage space provision/pooling, etc. will be illustrated in some of the subsequent embodiments. For example, as there are multiple layers of mapping relationships between different types of addresses, each layer of the multiple layers of mapping relationships may be regarded as a layer of remapping relationships among the multiple layers of mapping relationships, and these layers may be regarded as translation layers such as address translation layers.

Figure 7:
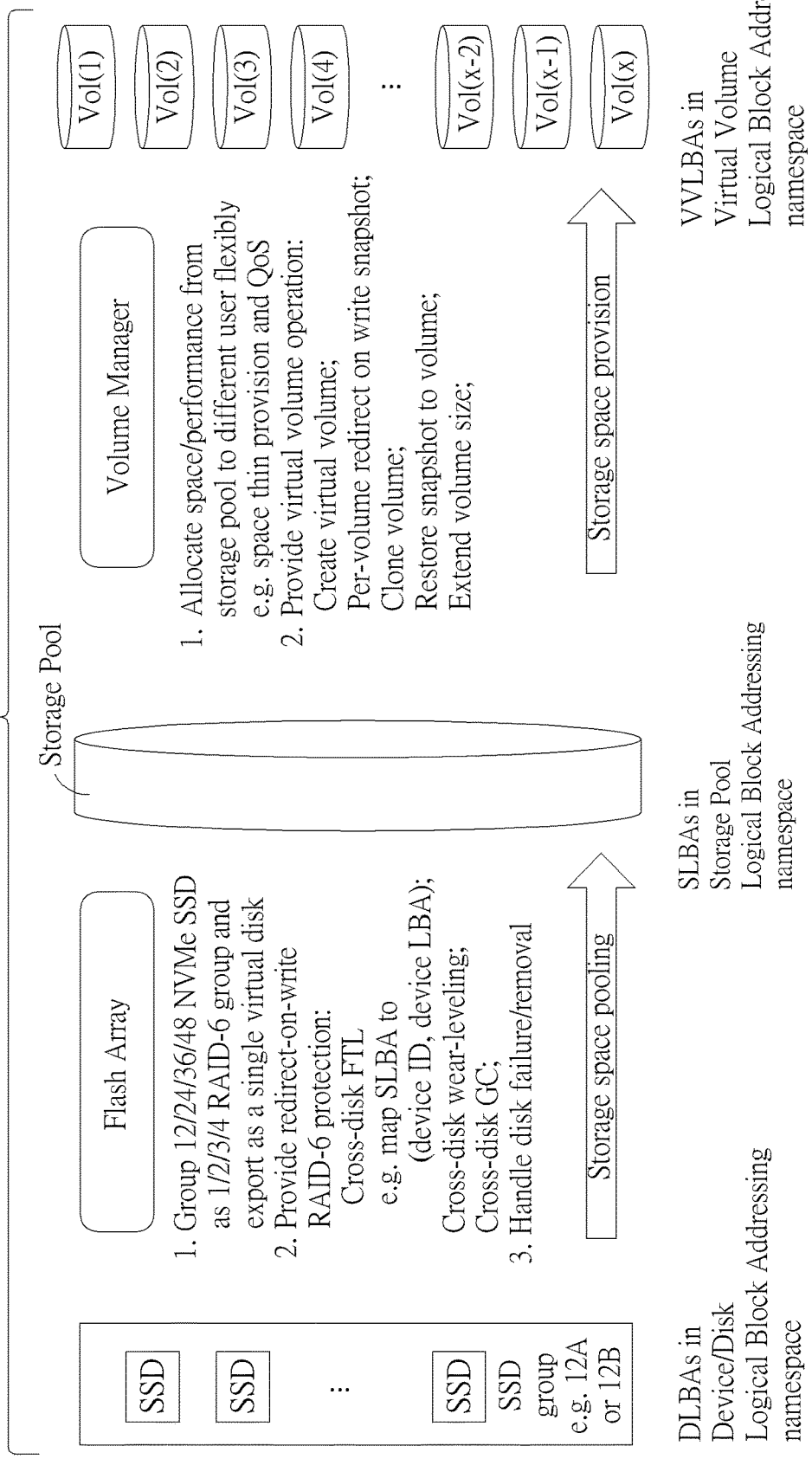
FIG. 7 illustrates a multiple remapping control scheme of the method for performing data access management of the AFA server according to an embodiment of the present invention, where the AFA server may be equipped with some remapping layers between addresses of different namespaces.

FIG. 7 illustrates a multiple remapping control scheme of the method for performing data access management of the AFA server (e.g. the AFA server 100 shown in FIG. 1) according to an embodiment of the present invention, where the AFA server may be equipped with some remapping layers between addresses of different namespaces. More particularly, in the AFA server 100, each node of the nodes 100A and 100B can be configured to perform data access management with aid of multiple remapping layers between different addressing namespaces. For example, the addressing namespaces may comprise a device/disk logical block addressing namespace of a series of device logical block addresses (DLBAs), a storage spool logical block addressing namespace of a series of storage spool logical block addresses (SLBAs), and a virtual volume logical block addressing namespace of a series of virtual volume logical block addresses (VVLBAs). In this situation, there may be at least three namespaces with at least two remapping layers in the storage system of the node. In addition, the multiple remapping layers may comprise a first remapping layer between the device/disk logical block addressing namespace of the series of DLBAs and the storage spool logical block addressing namespace of the series of SLBAs, and may further comprise a second remapping layer between the storage spool logical block addressing namespace of the series of SLBAs and the virtual volume logical block addressing namespace of the series of VVLBAs.

As shown in the left half of FIG. 7, under control of the Flash Array module running on the node, the node can be configured to perform storage space pooling. The node (e.g. the Flash Array module running thereon) can perform the storage space pooling on a corresponding SSD group (e.g. the SSD group 12A for the node 100A, or the SSD group 12B for the node 100B) at the device/disk logical block addressing namespace to generate a logically combined storage device such as a storage pool (labeled "Storage Pool" on the cylinder indicating the logically combined storage device for better comprehension) at the storage spool logical block addressing namespace, to combine respective storage space of all SSDs in the corresponding SSD group into overall storage space of the storage spool. For example, the Flash Array module can group a predetermined amount (e.g. 12, 24, 36, 48, etc.) of SSDs as corresponding Redundant Array of Independent Disks (RAID) group(s), and more particularly, can group 12/24/36/48 NVM Express (NVMe) SSDs as 1/2/3/4 RAID-6 group(s), and export the corresponding RAID group(s) as a single virtual disk. In addition, the Flash Array module can provide redirect-on-write RAID-6 protection, including various operations of: Cross-disk Flash translation layer (FTL), for example, mapping any SLBA to a DLBA such as a combination of a device identifier (ID) of a certain storage device (e.g. an SSD of the SSD group) and a device logical block address (LBA) of this storage device (labeled "(device ID, device LBA)" for brevity); Cross-disk wear-leveling, for example, performing wear-leveling among the SSD group; and Cross-disk garbage collection (GC), for example, performing GC among the SSD group. Additionally, the Flash Array module can handle disk failure/removal, for example, perform error handling when a disk failure and/or disk removal of any of the SSDs in the SSD group occurs.

As shown in the right half of FIG. 7, under control of the Volume Manager module running on the node, the node can be configured to perform storage space provision. The node (e.g. the Volume Manager module running thereon) can perform the storage space provision on the storage pool at the storage spool logical block addressing namespace to generate a plurality of virtual volumes {Vol} such as x virtual volumes Vol(1)-Vol(x), to assign multiple portions of the overall storage space of the storage spool to be respective storage space of the plurality of virtual volumes {Vol}, for being used as respective dedicated storage regions of multiple purposes and/or multiple users. For example, the Volume Manager module can allocate space and/or performance (e.g. storage resources corresponding to the performance) from the storage pool to different users flexibly (e.g. space thin provision and quality of service (QoS)). In addition, the Volume Manager module can provide virtual volume operation, including various operations such as: create a virtual volume (which may be referred to as volume for brevity); generate per-volume redirect on write snapshot; clone a volume; restore a snapshot of a volume to the volume; and extend a volume size of a volume.

For better comprehension, the plurality of virtual volumes {Vol} may be illustrated to be the virtual volumes Vol(1), Vol(2), Vol(3), Vol(4), . . . , Vol(x-2), Vol(x-1), and Vol(x) as shown in FIG. 7, but the present invention is not limited thereto. In addition, some implementation details of the operations performed by the Flash Array module and the Volume Manager module may be illustrated as shown in FIG. 7, but the present invention is not limited thereto. For example, one or more of these implementation details may vary.

Figure 8:
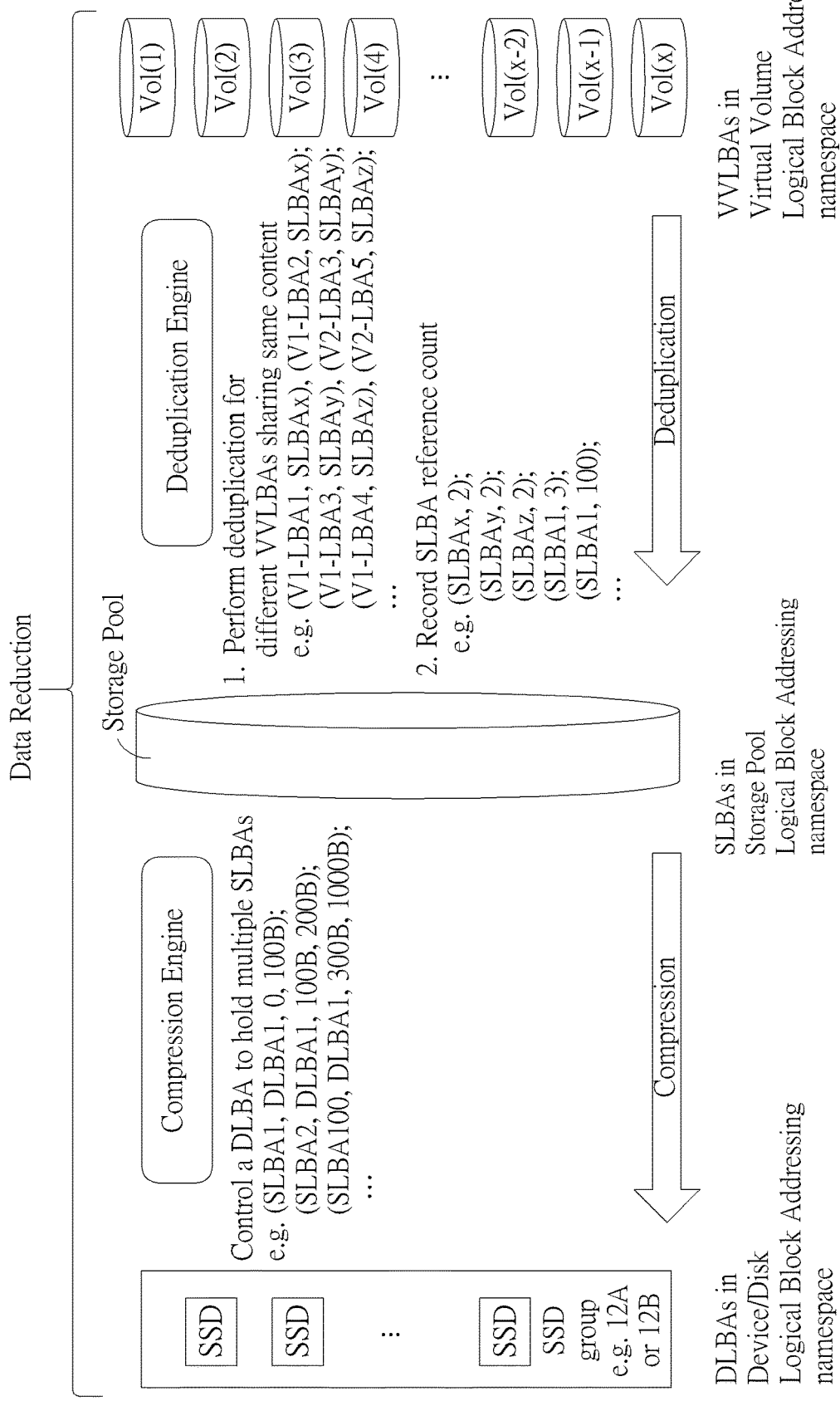
FIG. 8 illustrates a data reduction control scheme of the method for performing data access management of the AFA server according to an embodiment of the present invention.

FIG. 8 illustrates a data reduction control scheme of the method for performing data access management of the AFA server (e.g. the AFA server 100 shown in FIG. 1) according to an embodiment of the present invention. In the AFA server 100, each node of the nodes 100A and 100B can be configured to perform deduplication and compression with the aid of the aforementioned multiple remapping layers between different addressing namespaces.

As shown in the right half of FIG. 8, under control of the Deduplication Engine running on the node, the node can be configured to perform deduplication. The node (e.g. the Deduplication Engine running thereon) can perform the deduplication during writing, and more particularly, perform the deduplication at the second remapping layer between the storage spool logical block addressing namespace of the series of SLBAs and the virtual volume logical block addressing namespace of the series of VVLBAs. For example, when detecting that data to be written exists at a certain SLBA, the Deduplication Engine of the node can perform the deduplication by recording a hard-link pointing to this SLBA for the data to be written, to prevent duplication of the existing data at the SLBA, where the node can generate the hard-link instead of writing the same data to the storage pool again. For example, the Deduplication Engine can perform deduplication to manage different VVLBAs sharing the same content, such as: the VVLBA V1-LBA1 (e.g. a combination of the volume ID V1 of a certain virtual volume Vol(V1) and the LBA LBA1 of the virtual volume Vol(V1)) and the VVLBA V1-LBA2 (e.g. a combination of the volume ID V1 of the virtual volume Vol(V1) and the LBA LBA2 of the virtual volume Vol(V1)) sharing the same content at the SLBA SLBAx (labeled "(V1-LBA1, SLBAx), (V1-LBA2, SLBAx)" for brevity); the VVLBA V1-LBA3 (e.g. a combination of the volume ID V1 of the virtual volume Vol(V1) and the LBA LBA3 of the virtual volume Vol(V1)) and the VVLBA V2-LBA3 (e.g. a combination of the volume ID V2 of another virtual volume Vol(V2) and the LBA LBA3 of the virtual volume Vol(V2)) sharing the same content at the SLBA SLBAy (labeled "(V1-LBA3, SLBAy), (V2-LBA3, SLBAy)" for brevity); the VVLBA V1-LBA4 (e.g. a combination of the volume ID V1 of the virtual volume Vol(V1) and the LBA LBA4 of the virtual volume Vol(V1)) and the VVLBA V2-LBA5 (e.g. a combination of the volume ID V2 of the virtual volume Vol(V2) and the LBA LBA5 of the virtual volume Vol(V2)) sharing the same content at the SLBA SLBAz (labeled "(V1-LBA4, SLBAz), (V2-LBA5, SLBAz)" for brevity); and so on, but the present invention is not limited thereto. In addition, the Deduplication Engine can record SLBA reference counts, for example, by using a format of a combination of the SLBA of the shared content and the associated SLBA reference count as follows: (SLBAx, 2); (SLBAy, 2); (SLBAz, 2); (SLBA1, 3); (SLBA1, 100); and so on, but the present invention is not limited thereto.

As shown in the left half of FIG. 8, under control of the Compression Engine running on the node, the node can be configured to perform compression. The node (e.g. the Compression Engine running thereon) can perform the compression during writing, and more particularly, perform the compression at the first remapping layer between the device/disk logical block addressing namespace of the series of DLBAs and the storage spool logical block addressing namespace of the series of SLBAs. For example, the Compression Engine can compress N sets of data into N compressed data and record respective compression status information entries {{SLBA(1), DLBA(1), Start_Offset(1), Length(1)}, {SLBA(2), DLBA(2), Start_Offset(2), Length(2)}, . . . } of the N compressed data (e.g. a combination {SLBA(n), DLBA(n), Start_Offset(n), Length(n)} of the SLBA SLBA(n), the DLBA DLBA(n), the start offset Start_Offset(n), and the length Length(n) of the $n^{th}$ compressed data of the N compressed data), where the symbol "n" may represent an integer within the interval [1, N]), and collect and aggregate the N compressed data into a data stripe, for performing stripe write on the corresponding SSD group. For example, the Compression Engine can control a DLBA to hold multiple SLBAs, and can record compression status information entries respectively indicating the holding relationships, such as: a compression status information entry comprising a combination of the SLBA SLBA1, the DLBA DLBA1, the start offset of 0 bytes (B), and the length of 100 bytes (e.g. {SLBA(1)=SLBA1, DLBA(1)=DLBA1, Start_Offset(1)=0 (B), Length(1)=100 (B)}, labeled "(SLBA1, DLBA1, 0, 100B)" for brevity); a compression status information entry comprising a combination of the SLBA SLBA2, the DLBA DLBA1, the start offset of 100 bytes, and the length of 200 bytes (e.g. {SLBA(2)=SLBA2, DLBA(2)=DLBA1, Start_Offset(2)=100 (B), Length(2)=200 (B)}, labeled "(SLBA2, DLBA1, 100B, 200B)" for brevity); a compression status information entry comprising a combination of the SLBA SLBA100, the DLBA DLBA1, the start offset of 300 bytes, and the length of 1000 bytes (e.g. {SLBA(3)=SLBA100, DLBA(3)=DLBA1, Start_Offset(3)=300 (B), Length(3)=1000 (B)}, labeled "(SLBA100, DLBA1, 300B, 1000B)" for brevity); and so on, but the present invention is not limited thereto.

Some implementation details of the deduplication performed by the Deduplication Engine and the compression performed by the Compression Engine may be illustrated as shown in FIG. 8, but the present invention is not limited thereto. For example, one or more of these implementation details may vary.

Figure 9:
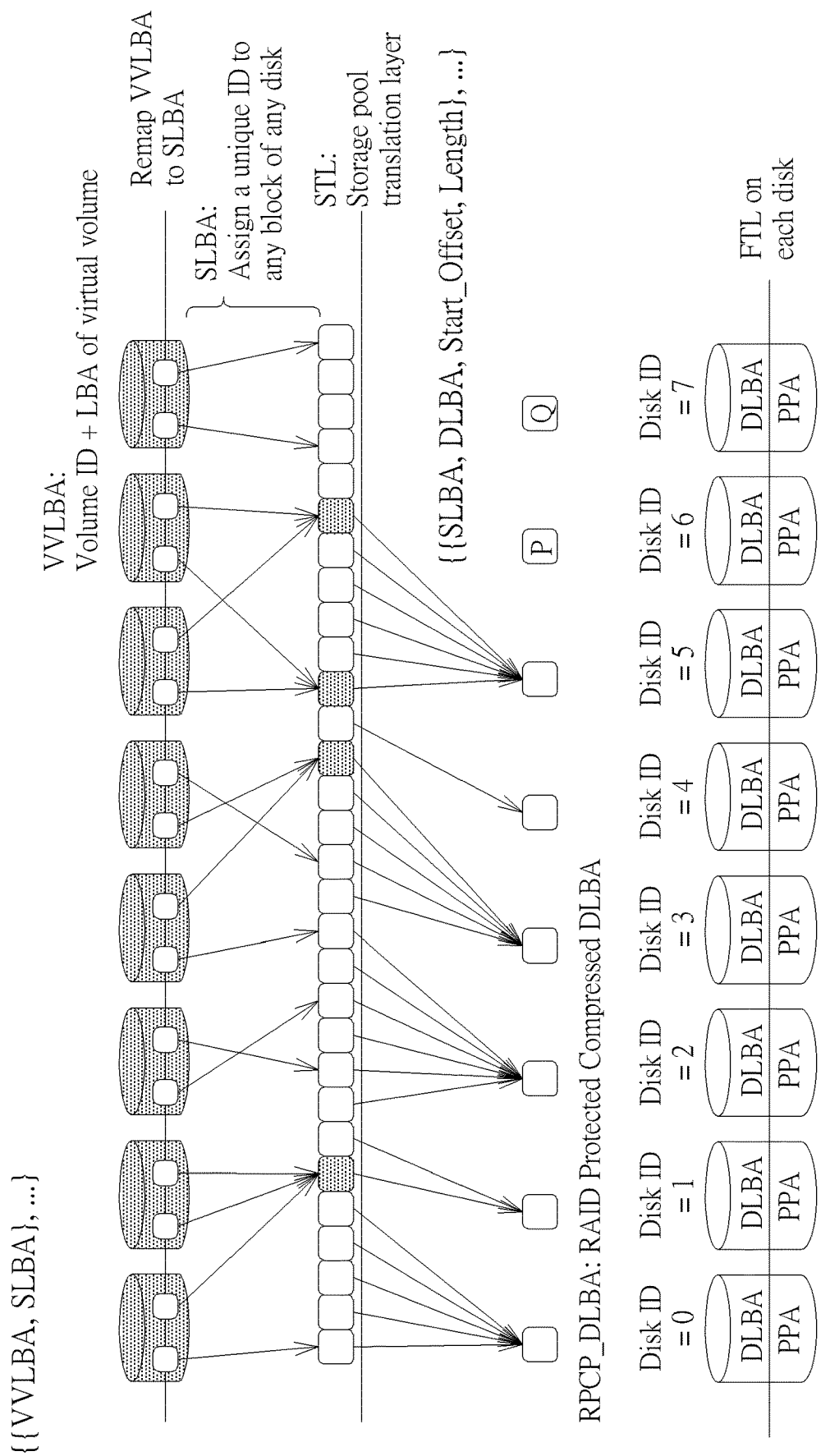
FIG. 9 illustrates some mapping relationships and associated management information in the method for performing data access management of the AFA server according to an embodiment of the present invention.

FIG. 9 illustrates some mapping relationships and associated management information in the method for performing data access management of the AFA server (e.g. the AFA server 100 shown in FIG. 1) according to an embodiment of the present invention. In the AFA server 100, each node of the nodes 100A and 100B can be configured to access data with the aid of the aforementioned multiple remapping layers between different addressing namespaces. For example, any VVLBA of the series of VVLBAs may comprise a combination of the volume ID of a certain virtual volume Vol and a LBA of the virtual volume Vol (labeled "Volume ID+LBA of virtual volume" for brevity).

When the write request from the client device indicates that writing a set of data at a VVLBA is required, the node can utilize the Volume Manager module to get or allocate a SLBA, and can utilizing the Volume Manager module to record a VVLBA-to-SLBA mapping information entry indicating the mapping relationship between the VVLBA and the SLBA in a situation where the first write of the data is performed, but the present invention is not limited thereto. For example, the node can consult the Deduplication Engine to perform the deduplication during writing as described in the embodiment shown in FIG. 8, and after the Deduplication Engine performs the deduplication to generating the hard-link, the node can utilize the Deduplication Engine to modify or update this mapping relationship to match the hard-link. In addition, as the node can receive multiple write requests and operate in response to the multiple write requests, respectively, the node can record multiple VVLBA-to-SLBA mapping information entries respectively indicating multiple mapping relationships between multiple VVLBAs and multiple SLBAs (labeled "{{VVLBA, SLBA}, . . . }" for brevity). For example, the node can use the multiple VVLBA-to-SLBA mapping information entries (e.g. {{VVLBA, SLBA}, . . . }) to remap the multiple VVLBAs to multiple SLBAs. By using the series of SLBAs, the node can assign a unique ID to any block of any disk (e.g. any SSD of the SSD group). Additionally, the node can consult the Compression Engine to perform the compression, and record multiple compression status information entries respectively indicating compression statuses of the compressed data (labeled "{{SLBA, DLBA, Start_Offset, Length}, . . . }" for brevity) such as that described in the embodiment shown in FIG. 8, but the present invention is not limited thereto.

For better comprehension, a row of cylinders shown at the uppermost of FIG. 9 and some small boxes therein may represent the plurality of virtual volumes {Vol} and the data at the multiple VVLBAs, respectively, and a row of small boxes that are continuously arranged below this row of cylinders may represent the non-compressed data at the multiple SLBAs, where a horizontal line passing through this row of cylinders may represent the second remapping layer between the storage spool logical block addressing namespace of the series of SLBAs and the virtual volume logical block addressing namespace of the series of VVLBAs. In addition, a set of disks #0, #1, . . . , and #7 having disk IDs of 0, 1, . . . , and 7 (illustrated with another row of cylinders as shown at the bottommost of FIG. 9) can be taken as an example of a set of SSD in the corresponding SSD group, and a row of small boxes above them may represent RAID protected compressed data having the compressed data and associated parity codes (labeled "P" and "Q" for better comprehension) stored in the set of disks #0-#7, for example, at a RAID Protected Compressed DLBA (RPCP_DLBA) comprising one or more DLBAs, where a horizontal line between the two rows of row of small boxes may represent the first remapping layer between the device/disk logical block addressing namespace of the series of DLBAs and the storage spool logical block addressing namespace of the series of SLBAs. Please note that the first remapping layer can be regarded as a storage pool translation layer (STL). In the SSD group comprising the set of disks #0-#7, the addressing namespaces may further comprise a device based SSD physical page addressing namespace of a series of device based SSD physical page addresses (PPAs). In addition, the multiple remapping layers may further comprise a FTL between the device based SSD physical page addressing namespace of the series of device based SSD PPAs and the device/disk logical block addressing namespace of the series of DLBAs, for address translation between the series of DLBAs and the respective PPAs of respective Flash memories of the SSDs in the SSD group.

According to some embodiments, as the Volume Manager module can generate and update the remapping table of the second remapping layer to record the multiple VVLBA-to-SLBA mapping information entries respectively indicating the multiple mapping relationships between the multiple VVLBAs and the multiple SLBAs, the Volume Manager module can manage these mapping relationships through the remapping table of the second remapping layer. During reading data at a VVLBA of the multiple VVLBAs data in response to the read request, the Volume Manager module can refer to the remapping table of the second remapping layer to obtain the SLBA associated with this VVLBA. In addition, as the Flash Array module can generate and update the remapping table of the first remapping layer to record multiple SLBA-to-DLBA mapping information entries respectively indicating multiple mapping relationships between the multiple SLBAs and multiple DLBAs, the Flash Array module can manage these mapping relationships through the remapping table of the first remapping layer. During reading data at the SLBA associated with this VVLBA in response to the read request, the Flash Array module can refer to the remapping table of the first remapping layer to obtain the DLBA associated with this SLBA. In a situation where the compression function of the Compression Engine is implemented (or enabled), the multiple compression status information entries {{SLBA, DLBA, Start_Offset, Length}, . . . } can be taken as examples of the multiple SLBA-to-DLBA mapping information entries, where the multiple compression status information entries {{SLBA, DLBA, Start_Offset, Length}, . . . } comprise the multiple mapping relationships between the multiple SLBAs and the multiple DLBAs, and further comprise respective compression statuses {Start_Offset, Length} of these compression status information entries {{SLBA, DLBA, Start_Offset, Length}, . . . }. No matter whether the compression function of the Compression Engine is implemented/enabled or not, as the Volume Manager module can generate and update the remapping table of the second remapping layer, and as the Flash Array module can generate and update the remapping table of the first remapping layer, the active node can refer to the respective remapping tables of the first and the second remapping layers during reading data, to obtain the associated mapping relationships and therefore obtain the data.

Figure 10:
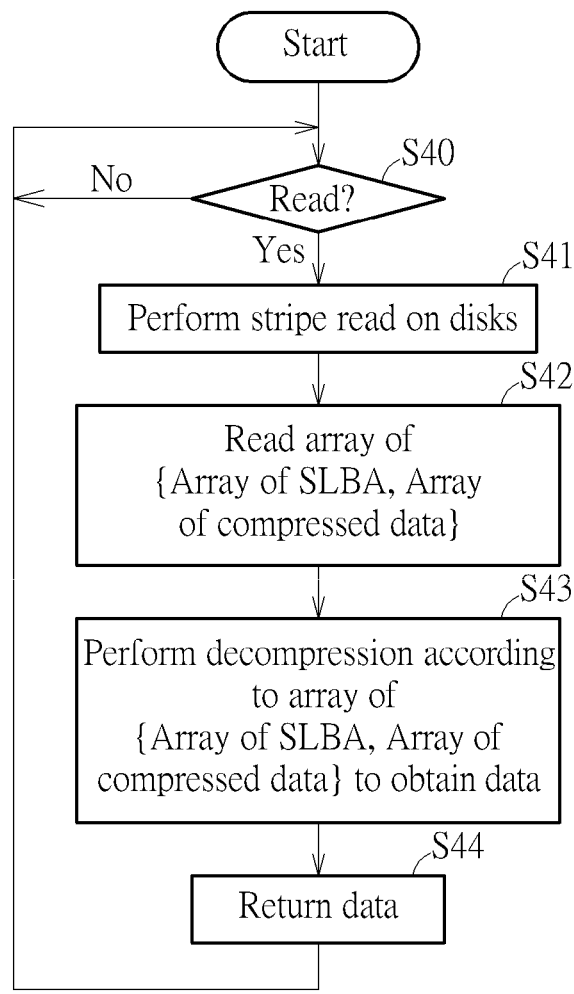
FIG. 10 is a flowchart regarding a read control scheme of the method for performing data access management of the AFA server according to an embodiment of the present invention.

FIG. 10 is a flowchart regarding a read control scheme of the method for performing data access management of the AFA server (e.g. the AFA server 100 shown in FIG. 1) according to an embodiment of the present invention. For better comprehension, the nodes 100A and 100B can play the role of the active node and the role of the standby node, respectively, but the present invention is not limited thereto. In addition, the Write Buffer module can be configured to control some operations during writing data, and can also be configured to control some operations during reading data. For example, the Write Buffer module can trigger some modules within the program modules 112 to perform at least one portion (e.g. a portion or all) of the operations of Steps S02-S08 shown in FIG. 5 and perform the associated operations in the working flow shown in FIG. 6 during writing data, and can trigger some modules within the program modules 112 to perform operations during reading data.

In Step S40, the active node (e.g. one of the nodes 100A and 100B, such as the node 100A in this embodiment) can utilize the Storage Protocol and Block-IO Interface module to detect whether any request such as the read request is received. If Yes, Step S41 is entered; if No, Step S40 is re-entered.

In Step S41, in response to the read request, the active node can utilize the Flash Array module to perform stripe read on respective disks in the SSD group of the active node (e.g. the SSD group 12A in this embodiment), and more particularly, to read at least one stripe (e.g. one or more stripes) from the SSD group. For better comprehension, the at least one stripe mentioned in Step S41 can be at least one of multiple stripes that have been written into the SSD group of the active node through multiple iterations of the working flow shown in FIG. 5, such as the full stripe that has been written into the SSD group in Step S30.

In Step S42, the active node can utilize the Write Buffer module to read associated array information (e.g. the array information for the at least one stripe) such as the array of {Array of SLBAs, Array of compressed data} from the Flash Array module.

In Step S43, the active node can utilize the Write Buffer module to consult the Compression Engine to perform decompression on the compressed data in the at least one stripe according to the associated array information (e.g. the array information for the at least one stripe) such as the array of {Array of SLBAs, Array of compressed data}, to obtain the data requested by the read request of the client device.

In Step S44, the active node can utilize the Write Buffer module to return the data to the client device, for example, through the upper layer program module such as the Storage Protocol and Block-IO Interface module.

According to this embodiment, when the Write Buffer module submit an internal read request corresponding to the read request of the client device to the Flash Array module, the Flash Array module can return the at least one stripe and the array of {Array of SLBAs, Array of compressed data} to the Write Buffer module, for the Write Buffer module to consult the Compression Engine to perform decompression, but the present invention is not limited thereto. According to some embodiments, when the Write Buffer module submit the internal read request corresponding to the read request of the client device to the Flash Array module, the Flash Array module can return the requested data and the compression statuses {Start Offset, Length} of the corresponding compression status information entry {SLBA, DLBA, Start_Offset, Length} to the Write Buffer module, for the Write Buffer module to consult the Compression Engine to perform decompression.

For better comprehension, the method may be illustrated with the working flow shown in FIG. 10, but the present invention is not limited thereto. According to some embodiments, one or more steps may be added, deleted, or changed in the working flow shown in FIG. 10.

Some implementation details regarding the program modules 112 shown in FIG. 4 may be further described as follows. According to some embodiments, in each node of the nodes 100A and 100B, the Storage Protocol and Block-IO Interface module can act as a storage protocol and backend IO interface, and more particularly, can utilize the SCSI module, the iSCSI module, etc. to export storage services for the users through some protocols such as SCSI, iSCSI, etc., where the Block Device module can interact with block devices (e.g. the SSDs of the SSD group) through other modules such as the Storage Caching module (e.g. the Write Buffer module thereof), the Storage Features module (e.g. the Volume Manager module thereof), the Storage Pool module (e.g. the Flash Array module thereof), etc. For example, the Storage Protocol and Block-IO Interface module can leverage implementation of a Storage Performance Development Kit (SPDK), and can be configured to have some additional features that do not exist in the SPDK. Regarding the additional features, the Storage Protocol and Block-IO Interface module can support Windows Hardware Quality Labs (WHQL) commands, handle SCSI abort or reset commands, and can provide predetermined unique identifier such as a predetermined World Wide Name (WWN), for example, for setting up a storage area network (SAN), but the present invention is not limited thereto. For example, although one target supporting two different protocols is not allowed by the SPDK, the Storage Protocol and Block-IO Interface module equipped with the additional features can manage one target supporting different protocols such as SCSI, iSCSI, etc. through the SCSI module, the iSCSI module, etc. In addition, the Storage Protocol and Block-IO Interface module equipped with the additional features can utilize the Block Device module to register various types of block device modules (e.g. NVMe block device module, memory block device module, manufacturer-defined block device module, etc.) and register multiple block device instances of the same type of block device modules (e.g. block device instances nvme0, nvme1, nvme2, nvme3, etc. of the NVMe block device module; block device instances memblk0, memblk1, memblk2, etc. of the memory block device module, and block device instances SMIB-Dev1, SMIBDev2, SMIBDev3, etc. of the manufacturer-defined block device module). Additionally, the Block Device module can associate block devices with storage protocol, and more particularly, use the iSCSI module to map a block device to a SCSI device, a logical unit number (LUN) of a certain iSCSI target, etc., but the present invention is not limited thereto. For example, the Block Device module can manage device mapping of difference layers, including: mapping LUNs LUN1, LUN2, LUN3, etc. of one of multiple iSCSI targets to SCSI devices SCSI_Dev1, SCSI_Dev2, SCSI_Dev3, etc., mapping the SCSI devices SCSI_Dev1, SCSI_Dev2, SCSI_Dev3, etc. to manufacturer-defined block devices SMIBDev1, SMIB-Dev2, SMIBDev3, etc., and mapping the manufacturer-defined block devices SMIBDev1, SMIBDev2, SMIBDev3, etc. to the virtual volumes Vol(1), Vol(2), Vol(3), etc. managed by the Volume Manager module.

According to some embodiments, in each node of the nodes 100A and 100B, the Storage Caching module (e.g. the Write Buffer module) can be configured to provide a ring based memory buffer for serving user write IO such as data to be written. The Storage Caching module can utilize the Write Buffer module as a memory space manager to manage a ring buffer in the DRAM of the node (e.g. one of the DRAMs 120A and 120B). For example, the Write Buffer module can allocate a memory (e.g. a memory region in the ring buffer) for storing user write IO such as the data to be written, and can reclaim the memory (e.g. the memory region in the ring buffer) after flushing the data to the Flash Array (FA) of the node (e.g. the FA formed with the SSD group under the control of the Flash Array module shown in FIG. 4). The Write Buffer module can leverage the service of the PMem to mirror data to the standby node, and can commit write complete to a user when an operation of writing data to the active/service node memory (e.g. the DRAM of the active node) is done or when an operation of writing data to the standby node memory (e.g. the DRAM of the standby node) is done. In addition, the Storage Caching module (e.g. the Write Buffer module) can be configured to provide the service of user read IO, and more particularly, consult the Volume Manager module to determine a data location of the data (e.g. the location where the data is stored, such as a SLBA) by querying a volume remapping table such as the remapping table of the second remapping layer, and does not have to place loaded data from the FA to the write buffer memory (e.g. the write buffer managed by the Write Buffer module, in the DRAM of the node), where no read caching is required. For example, when the user never writes, the Write Buffer module can commit to the client device of the user with all-zero data; when the data is in the write buffer memory, the Write Buffer module can copy the data from the memory to an IO buffer (e.g. a buffer managed by the Storage Protocol and Block-IO Interface module, in the DRAM of the node) and commit to the client device of the user; and when the data is in the FA, the Write Buffer module can submit the internal read request to the FA to obtain the data, for returning the data. Additionally, the Storage Caching module (e.g. the Write Buffer module) can be configured to flush data from the write buffer memory to the FA and perform inline storage features, and more particularly, perform a series of operations such as that shown in FIG. 11.

Figure 11:
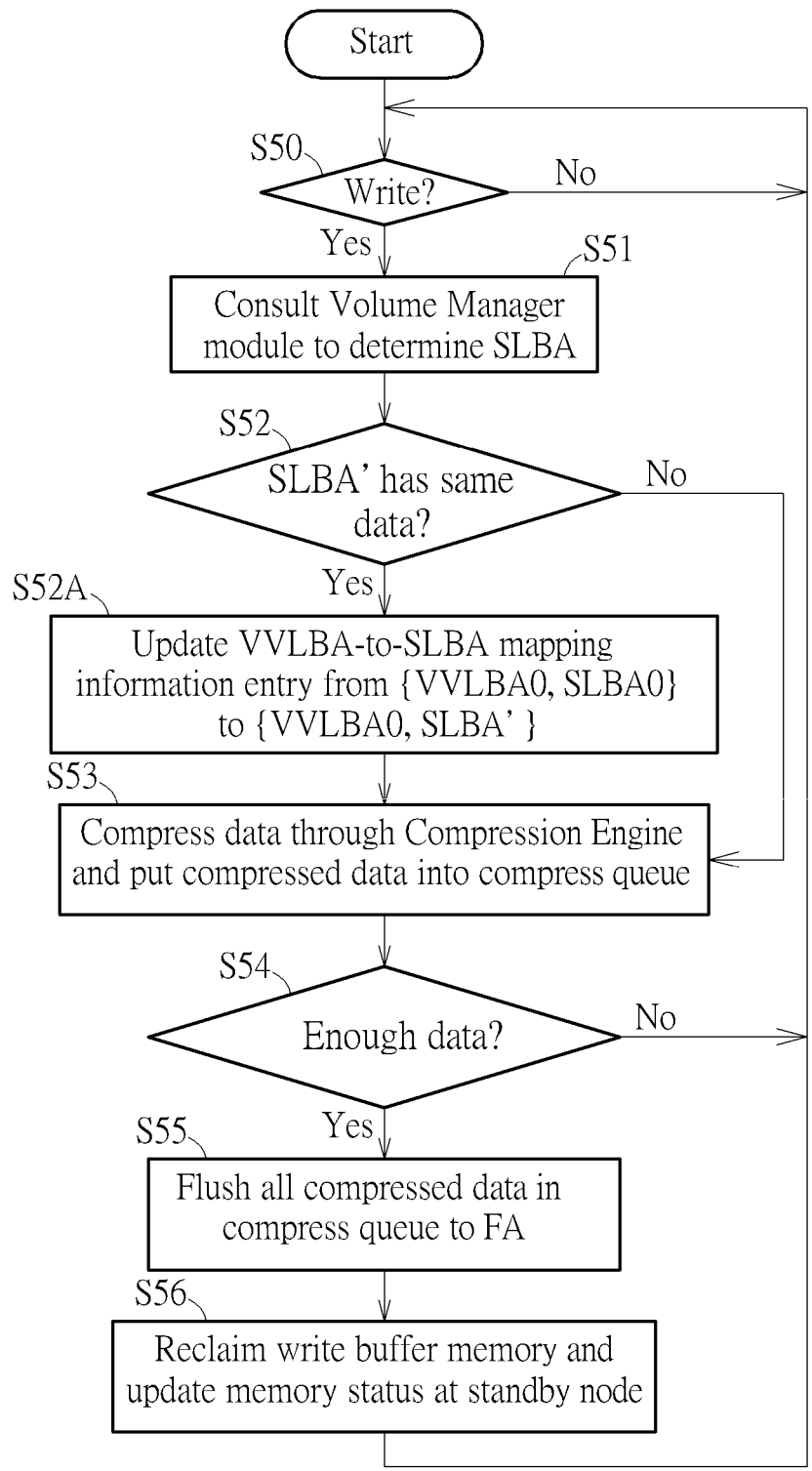
FIG. 11 is a flowchart regarding a write control scheme of the method for performing data access management of the AFA server according to another embodiment of the present invention.

FIG. 11 is a flowchart regarding a write control scheme of the method for performing data access management of the AFA server (e.g. the AFA server 100 shown in FIG. 1) according to another embodiment of the present invention. For better comprehension, the nodes 100A and 100B can play the role of the active node and the role of the standby node, respectively, but the present invention is not limited thereto.

In Step S50, the active node (e.g. one of the nodes 100A and 100B, such as the node 100A in this embodiment) can utilize the Storage Protocol and Block-IO Interface module to detect whether any request such as the write request is received. If Yes, Step S51 is entered; if No, Step S50 is re-entered.

In Step S51, in response to the write request for writing data at a VVLBA VVLBA0, the Write Buffer module can consult the Volume Manager module to determine a SLBA SLBA0, in order to know where to store the data, where the Volume Manager module can return a SLBA SLBA0. For example, regarding the case of first write (e.g. in a situation where the Volume Manager module detects that none of the multiple VVLBA-to-SLBA mapping information entries in the remapping table of the Volume Manager module comprises the VVLBA VVLBA0, which means the VVLBA VVLBA0 cannot be found in any VVLBA-to-SLBA mapping information entry), the Volume Manager module can allocate a new SLBA to be the SLBA SLBA0 for storing the data, and record a VVLBA-to-SLBA mapping information entry {VVLBA0, SLBA0} in the remapping table of the Volume Manager module. For another example, regarding the case of overwrite (e.g. in a situation where the Volume Manager module detects that the VVLBA-to-SLBA mapping information entry {VVLBA0, SLBA0} among the multiple VVLBA-to-SLBA mapping information entries in the remapping table of the Volume Manager module comprises the VVLBA VVLBA0), the Volume Manager module can return the SLAB SLBA0 for overwriting the data, such as the SLAB SLBA0 that has been associated with the VVLBA VVLBA0 in a previous write operation.

In Step S52, the Write Buffer module can consult the Deduplication Engine to determine whether there is another SLBA SLBA' having the same data as the new data to be written, wherein the determination result may indicate whether the new data to be written is repeated data. If Yes (e.g. the SLBA SLBA' having the same data as the new data to be written is detected, i.e. the new data to be written is repeated data), Step S52A is entered; if No, Step S53 is entered.

In Step S52A, the Deduplication Engine can notify the Volume Manager module to update (e.g. change) the VVLBA-to-SLBA mapping information entry {VVLBA0, SLBA0} in the remapping table of the Volume Manager module from {VVLBA0, SLBA0} to {VVLBA0, SLBA'}, where the updated VVLBA-to-SLBA mapping information entry {VVLBA0, SLBA'} can be taken as an example of the hard-link.

In Step S53, the Write Buffer module can compress the data through the Compression Engine and put the compressed data into a compress queue managed by the Flash Array module.

In Step S54, the Flash Array module can check whether the compress queue has accumulated enough data, for example, check whether all compressed data in the compress queue reaches a predetermined data amount (e.g. the full stripe). If Yes (e.g. the compress queue has accumulated enough data), Step S55 is entered; if No, Step S50 is re-entered.

In Step S55, the Flash Array module can flush all compressed data in the compress queue to the FA (e.g. the FA formed with the SSD group under the control of the Flash Array module), where Flash Array module can update the remapping table of the Flash Array module (e.g. the compression status information entries {{SLBA, DLBA, Start_Offset, Length}, . . . } in this remapping table). When the operation of Step S55 is completed (e.g. the Flash Array module has written all compressed data in the compress queue to the SSD group), the Flash Array module can notify the Write Buffer module of the completion state.

In Step S56, the Write Buffer module can reclaim the write buffer memory and update the memory statuses (e.g. the respective remapping tables of the Volume Manager module and the Flash Array module) at the standby node.

For better comprehension, the method may be illustrated with the working flow shown in FIG. 11, but the present invention is not limited thereto. According to some embodiments, one or more steps may be added, deleted, or changed in the working flow shown in FIG. 11.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access management of an all flash array (AFA) server, the method comprising:

utilizing an upper layer program module above an intermediate layer program module among multiple program modules running on a first node of multiple nodes of the AFA server to detect whether any request from a client device of a user is received, wherein at least one request comprising a write request is received, the first node powered by a first external power source;

in response to the write request, utilizing the intermediate layer program module to buffer data corresponding to the write request in a first volatile memory of the first node, and mirror the buffered data to a second node of the multiple nodes through at least one communications path between the first node and the second node, wherein the data is mirrored from the first volatile memory of the first node to a second volatile memory of the second node, the second node powered by a second external power source;

in response to the data being mirrored from the first volatile memory of the first node to the second volatile memory of the second node to be protected by internal backup of the second node, utilizing the intermediate layer program module to send an acknowledgement (Ack) corresponding to the write request to the client device through the upper layer program module; and utilizing the intermediate layer program module to internally copy the data in the first volatile memory of the first node and the data in the second volatile memory of the second node to a lower layer program module below the intermediate layer program module among the multiple program modules comprising a solid state drive (SSD) group;

wherein the first node comprises a first backup power unit and a first copy-to-flash (C2F) storage device coupled via a bus to the first volatile memory configured to flush buffered data that has not yet been internally copied to the SSD group from the first volatile memory to the first C2F storage device in response to occurrence of power failure of the first external power source, wherein the first backup power unit provides power to the first node in response to occurrence of power failure of the first external power source; and wherein the second node comprises a second backup power unit and a second C2F storage device coupled via a bus to the second volatile memory, and the data mirrored from the first volatile memory of the first node to the second volatile memory of the second node that has not yet been internally copied to the SSD group will be flushed from the second volatile memory to the second C2F storage device in response to occurrence of power failure of the second external power source, wherein the second backup power unit provides power to the second node in response to occurrence of power failure of the second external power source.

2. The method of claim 1, wherein the first node plays a role of an active node in a high availability (HA) architecture of the AFA server, and the second node plays a role of a standby node in the HA architecture.

3. The method of claim 1, wherein the first node plays a role of an active node in a high availability (HA) architecture of the AFA server, and the second node plays a role of a standby node in the HA architecture; and the first node and the second node exchange their roles to play the role of the standby node and the role of the active node, respectively, to mirror other data from the second volatile memory of the second node to the first volatile memory of the first node.

4. The method of claim 1, wherein the upper layer program module comprises a Storage Protocol and Block-Input/Output (IO) Interface module configured to interact with the client device, the lower layer program module comprises a Storage Pool module configured to interact with an SSD group of the first node, and the intermediate layer program module comprises a Storage Caching module configured to operate between the Storage Protocol and Block-IO Interface module and the Storage Pool module.

5. The method of claim 4, wherein in the AFA server, each node of the multiple nodes is configured to perform data access management with aid of multiple remapping layers between different addressing namespaces; and a Volume Manager module among the multiple program modules is configured to provide one of the multiple remapping layers, and a Flash Array module within the Storage Pool module is configured to provide another of the multiple remapping layers.

6. The method of claim 1, wherein in the AFA server, each node of the multiple nodes is configured to perform data access management with aid of multiple remapping layers between different addressing namespaces; the addressing namespaces comprise a device logical block addressing namespace of a series of device logical block addresses (DLBAs), a storage spool logical block addressing namespace of a series of storage spool logical block addresses (SLBAs), and a virtual volume logical block addressing namespace of a series of virtual volume logical block addresses (VVLBAs); and the one of the multiple remapping layers is a first remapping layer between the device logical block addressing namespace of the series of DLBAs and the storage spool logical block addressing namespace of the series of SLBAs, and the other of the multiple remapping layers is a second remapping layer between the storage spool logical block addressing namespace of the series of SLBAs and the virtual volume logical block addressing namespace of the series of VVLBAs.

7. The method of claim 6, wherein the lower layer program module comprises a Flash Array module configured to determining a DLBA for the data during writing the data; and under control of the Flash Array module running on the first node, the first node is configured to perform storage space pooling on the SSD group at the device logical block addressing namespace to generate a storage pool at the storage spool logical block addressing namespace, to combine respective storage space of all SSDs in the SSD group into overall storage space of the storage spool, wherein the storage pool is a logically combined storage device.

8. The method of claim 6, wherein the multiple program modules comprises a Volume Manager module configured to determine a SLBA for the data during writing the data; and under control of the Volume Manager module running on the first node, the first node is configured to perform storage space provision on a storage pool at the storage spool logical block addressing namespace to generate a plurality of virtual volumes, to assign multiple portions of overall storage space of the storage pool to be respective storage space of the plurality of virtual volumes, for being used as respective dedicated storage regions, wherein the storage pool is a logically combined storage device generated from combining the SSD group at the device logical block addressing namespace.

9. The method of claim 1, further comprising:
utilizing the lower layer program module to compress the data to generate a set of compressed data;
utilizing the lower layer program module to collect multiple sets of compressed data and write the multiple sets of compressed data into an SSD group corresponding to the first node, to generate a stripe comprising multiple chunks respectively stored in multiple SSDs in the SSD group, wherein the multiple sets of compressed data comprise the set of compressed data; and
utilizing the lower layer program module to record respective compression status information entries of the sets of compressed data, wherein the compression status information entries indicate the respective compression statuses of the sets of compressed data, respectively.

10. The method of claim 9, wherein the at least one request further comprises a read request; and the method further comprises:
- in response to the read request, utilizing the intermediate layer program module to submit an internal read request corresponding to the read request to the lower layer program module;
- utilize the lower layer program module to read the stripe from the SSD group for the intermediate layer program module;
- utilize the intermediate layer program module to consult a compression-related program module to perform decompression on the stripe to obtain the data; and
- utilize the intermediate layer program module to return the data to the client device through the upper layer program module.

11. An all flash array (AFA) server, comprising:
multiple nodes, comprising:
- a first node powered by a first external power source, the first node comprising:
  - at least one processor, arranged to control operations of the first node under control of a first set of program modules; and
  - a first volatile memory, arranged to temporarily store information for the first node; and
- a second node powered by a second external power source, the second node comprising:
  - at least one processor, arranged to control operations of the second node under control of a second set of program modules, wherein the second set of program modules are the same as the first set of program modules, respectively; and
  - a second volatile memory, arranged to temporarily store information for the second node; and
a plurality of solid state drives (SSDs), comprising:
- a first SSD group corresponding to the first node; and
- a second SSD group corresponding to the second node;
wherein:
an upper layer program module above an intermediate layer program module among the first set of program modules running on the first node detects whether any request from a client device of a user is received, wherein at least one request comprising a write request is received;
in response to the write request, the intermediate layer program module buffers data corresponding to the write request in a first volatile memory of the first node, and mirrors the buffered data to the second node through at least one communications path between the first node and the second node, wherein the data is mirrored from the first volatile memory of the first node to the second volatile memory of the second node;
in response to the data being mirrored from the first volatile memory of the first node to the second volatile memory of the second node to be protected by internal backup of the second node, the intermediate layer program module sends an acknowledgement (Ack) corresponding to the write request to the client device through the upper layer program module; and utilizing the intermediate layer program module to internally copy the data in the first volatile memory of the first node and the data in the second volatile memory of the second node to a lower layer program module below the intermediate layer program module among the multiple program modules comprising a solid state drive (SSD) group;
wherein the first node comprises a first backup power unit and a first copy-to-flash (C2F) storage device coupled via a bus to the first volatile memory configured to flush buffered data that has not yet been internally copied to the SSD group from the first volatile memory to the first C2F storage device in response to occurrence of power failure of the first external power source, wherein the first backup power unit provides power to the first node in response to occurrence of power failure of the first external power source; and
wherein the second node comprises a second backup power unit and a second C2F storage device coupled via a bus to the second volatile memory, and the data mirrored from the first volatile memory of the first node to the second volatile memory of the second node that has not yet been internally copied to the SSD group will be flushed from the second volatile memory to the second C2F storage device in response to occurrence of power failure of the second external power source, wherein the second backup power unit provides power to the second node in response to occurrence of power failure of the second external power source.

12. The AFA server of claim 11, wherein:
- the lower layer program module compresses the data to generate a set of compressed data;
- the lower layer program module collects multiple sets of compressed data and writes the multiple sets of compressed data into the first SSD group corresponding to the first node, to generate a stripe comprising multiple chunks respectively stored in multiple SSDs in the first SSD group, wherein the multiple sets of compressed data comprise the set of compressed data; and
- the lower layer program module records respective compression status information entries of the sets of compressed data, wherein the compression status information entries indicate the respective compression statuses of the sets of compressed data, respectively.

13. The AFA server of claim 12, wherein the at least one request further comprises a read request, wherein:
- in response to the read request, the intermediate layer program module submits an internal read request corresponding to the read request to the lower layer program module;
- the lower layer program module reads the stripe from the first SSD group for the intermediate layer program module;
- the intermediate layer program module consults a compression-related program module to perform decompression on the stripe to obtain the data; and
- the intermediate layer program module returns the data to the client device through the upper layer program module.

* * * * *